(12) United States Patent
Rangachari et al.

(10) Patent No.: US 8,473,777 B1
(45) Date of Patent: Jun. 25, 2013

(54) METHOD AND SYSTEM FOR PERFORMING RECOVERY IN A STORAGE SYSTEM

(75) Inventors: Muralidharan Rangachari, Cupertino, CA (US); Anagha Barve, Sunnyvale, CA (US); Vineeth Karinta, Fremont, CA (US)

(73) Assignee: Netapp, Inc., Sunnyvale, CA (US)

( * ) Notice: Subject to any disclaimer, the term of this patent is extended or adjusted under 35 U.S.C. 154(b) by 331 days.

(21) Appl. No.: 12/770,531

(22) Filed: Apr. 29, 2010

Related U.S. Application Data

(60) Provisional application No. 61/308,266, filed on Feb. 25, 2010.

(51) Int. Cl.
*G06F 11/00* (2006.01)

(52) U.S. Cl.
USPC ............................. 714/6.12; 711/159; 711/112

(58) Field of Classification Search
USPC ......................................................... 714/6.12
See application file for complete search history.

(56) References Cited

U.S. PATENT DOCUMENTS

| | | | | |
|---|---|---|---|---|
| 7,007,047 B2 * | 2/2006 | Zelenka et al. | ........................ | 1/1 |
| 7,035,881 B2 * | 4/2006 | Tummala et al. | ............. | 707/639 |
| 7,085,785 B2 * | 8/2006 | Sawdon et al. | ........................ | 1/1 |
| 7,127,577 B2 * | 10/2006 | Koning et al. | ................ | 711/162 |
| 7,272,619 B1 * | 9/2007 | Lanzatella et al. | ..................... | 1/1 |
| 7,409,511 B2 * | 8/2008 | Edwards et al. | ............... | 711/161 |
| 7,437,603 B2 * | 10/2008 | Ebata et al. | ..................... | 714/6.1 |
| 7,480,778 B2 * | 1/2009 | Somavarapu | ................. | 711/159 |
| 7,716,183 B2 * | 5/2010 | Lee | ............... | 707/639 |
| 7,877,357 B1 * | 1/2011 | Wu et al. | ........................ | 707/639 |
| 8,041,888 B2 * | 10/2011 | Rajan et al. | ..................... | 711/112 |
| 8,060,714 B1 * | 11/2011 | Natanzon | ....................... | 711/162 |
| 8,074,038 B2 * | 12/2011 | Lionetti et al. | ................. | 711/162 |
| 8,099,572 B1 * | 1/2012 | Arora et al. | .................... | 711/162 |
| 8,135,674 B2 * | 3/2012 | Wu et al. | ........................ | 707/639 |
| 2003/0187883 A1 * | 10/2003 | Zelenka et al. | ............... | 707/201 |
| 2005/0065985 A1 * | 3/2005 | Tummala et al. | ............. | 707/201 |
| 2005/0182910 A1 * | 8/2005 | Stager et al. | ................... | 711/162 |
| 2005/0246397 A1 * | 11/2005 | Edwards et al. | ............... | 707/204 |
| 2007/0174669 A1 * | 7/2007 | Ebata et al. | ....................... | 714/6 |
| 2008/0114951 A1 * | 5/2008 | Lee | ............... | 711/162 |
| 2008/0256311 A1 * | 10/2008 | Lee | ............... | 711/162 |
| 2009/0164839 A1 * | 6/2009 | Ogihara et al. | ................... | 714/6 |
| 2009/0307450 A1 * | 12/2009 | Lee | ............... | 711/162 |
| 2010/0174690 A1 * | 7/2010 | Marcotte | ....................... | 707/695 |
| 2011/0173401 A1 * | 7/2011 | Usgaonkar et al. | ........... | 711/162 |

* cited by examiner

*Primary Examiner* — Kamini Patel
(74) *Attorney, Agent, or Firm* — Klein, O'Neill & Singh, LLP

(57) ABSTRACT

Method and system for performing recovery for a replicated copy of a storage space presented as a logical object is provided. An attribute associated with the logical object for enabling the recovery is set and when the storage space is replicated the attribute is stored as metadata for the replicated copy of the storage space. Based on the attribute, a clone of the logical object is presented as a writable option to write to the first replicated copy. After the write operation where information is written to the clone, a second replicated copy with the clone information is created. The clone is deleted after the second copy is generated.

20 Claims, 13 Drawing Sheets

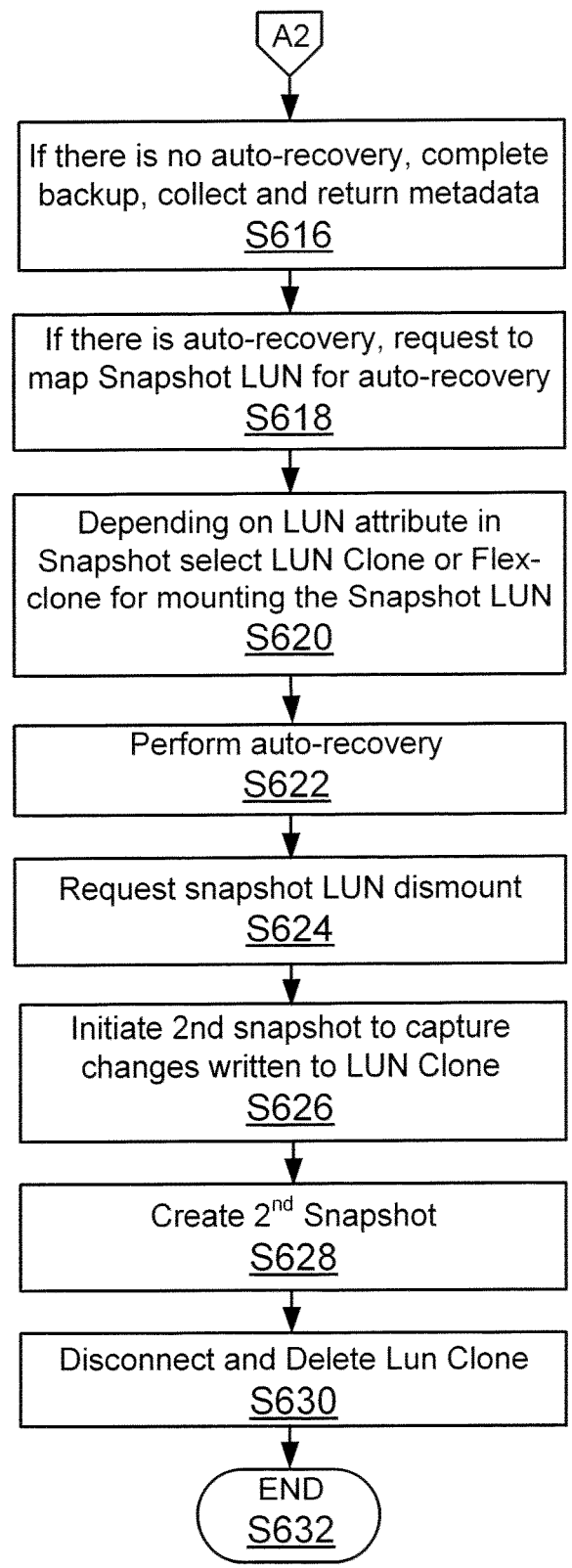
FIG. 6A(ii)

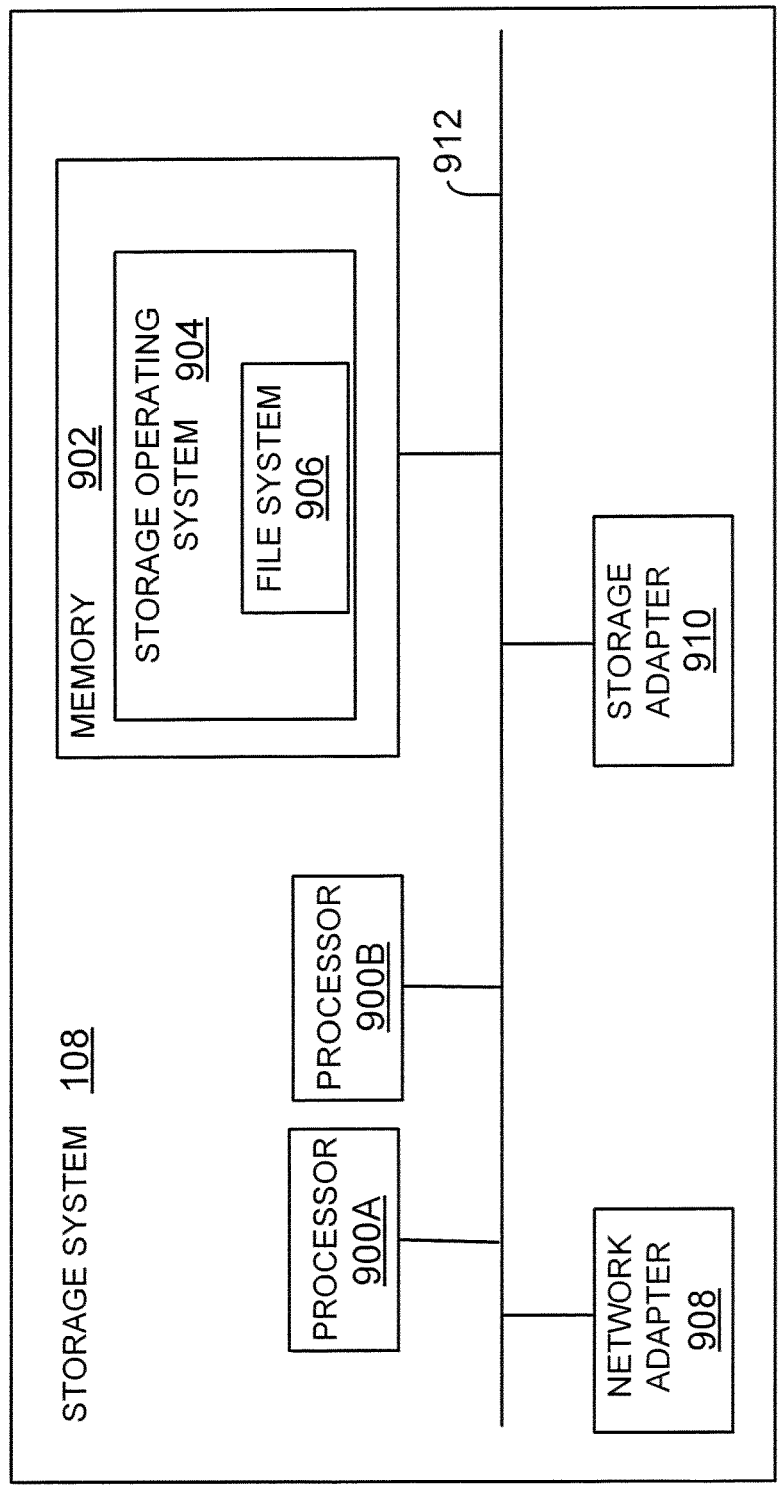

METHOD AND SYSTEM FOR PERFORMING RECOVERY IN A STORAGE SYSTEM

CROSS REFERENCE TO RELATED APPLICATION

This patent application claims priority to U.S. Provisional Patent Application Ser. No. 61/308,266, entitled "Autorecovery Method and System", filed on Feb. 25, 2010, the disclosure of which is incorporated herein by reference in its entirety.

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client processing systems ("clients"). The storage operating system stores and manages shared data containers in a set of mass storage devices.

Information stored at mass storage devices is typically replicated or "backed up" by a backup process that creates a read-only backup copy of the information at a point in time. The read-only backup copy can be used to restore information to the point in time when the backup was taken. Certain operating environments however need a writable backup copy. Continuous efforts are being made to provide methods and systems for managing read-only backup copies in operating environments that need a writable backup copy.

SUMMARY

In one embodiment, a method and system for performing auto-recovery (also referred to as "recovery") for a replicated copy of a storage space presented as a logical object is provided. An attribute associated with the logical object for enabling auto-recovery is set. When the storage space is replicated the attribute is stored as metadata for the replicated copy. Based on the attribute, a clone of the logical object is presented as a writable option to write to the first replicated copy. After the write operation where information is written to the clone, a second replicated copy with the clone information is created. The clone is deleted after the second copy is generated.

In another embodiment, a machine implemented method is provided. The method includes setting a recovery indicator for a storage space configured for a replication operation. The recovery indicator is set as an attribute of a logical object representing the storage space and recovery is used for maintaining consistency between information stored at a read-only copy of the storage space and information stored the storage space after the read-only copy is created.

The method further includes replicating the storage space and the recovery indicator by generating a first read-only copy of the storage space and storing a metadata associated with the first read-only copy; and based on the recovery indicator, using a clone of the logical object for recovery, wherein the clone is created after the first read-only copy is generated.

In yet another embodiment, a machine implemented method for a storage space represented by a logical object is provided. The method includes storing a recovery indicator with a first replicated read-only copy of information stored at the storage space. The recovery indicator is used for maintaining consistency between information stored at the first replicated read-only copy and information stored at the storage space, after the first replicated read-only copy is created.

The method further includes providing a clone of the storage space as a writable option to write data to the storage space, after the first replicated read-only copy is created; using an original name of the logical object for renaming the clone, after writing to the clone; and generating a second replicated read-only copy for capturing changes to the clone after the first replicated read-only copy is created.

In another embodiment, a machine implement method for replicating a storage space represented as a logical unit number (LUN) is provided. The method includes generating a LUN attribute for enabling recovery that is used for maintaining consistency between information stored at a read-only copy of the LUN and information stored at the LUN after the read-only copy is generated; and storing the LUN attribute with a first read-only copy of the LUN.

The method further includes using a LUN clone for recovery, where the LUN clone is a copy of the LUN that is created after the first read-only copy is generated and to which an application is allowed to write; and generating second read-only copy capturing information stored at the LUN clone.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 9A shows an example of a storage system, used according to one embodiment.

DETAILED DESCRIPTION

As used in this disclosure, the terms "component", "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Method and system for performing auto-recovery for a replicated copy of a storage space presented as a logical object is provided. An attribute associated with the logical object for enabling auto-recovery is set. When the storage space is replicated the attribute is stored as metadata for the replicated copy. Based on the attribute, a clone of the logical object is presented as a writable option to write to the first replicated copy. After the write operation where information is written to the clone, a second replicated copy with the clone information is created. The clone is deleted after the second copy is generated.

Figure 1A:
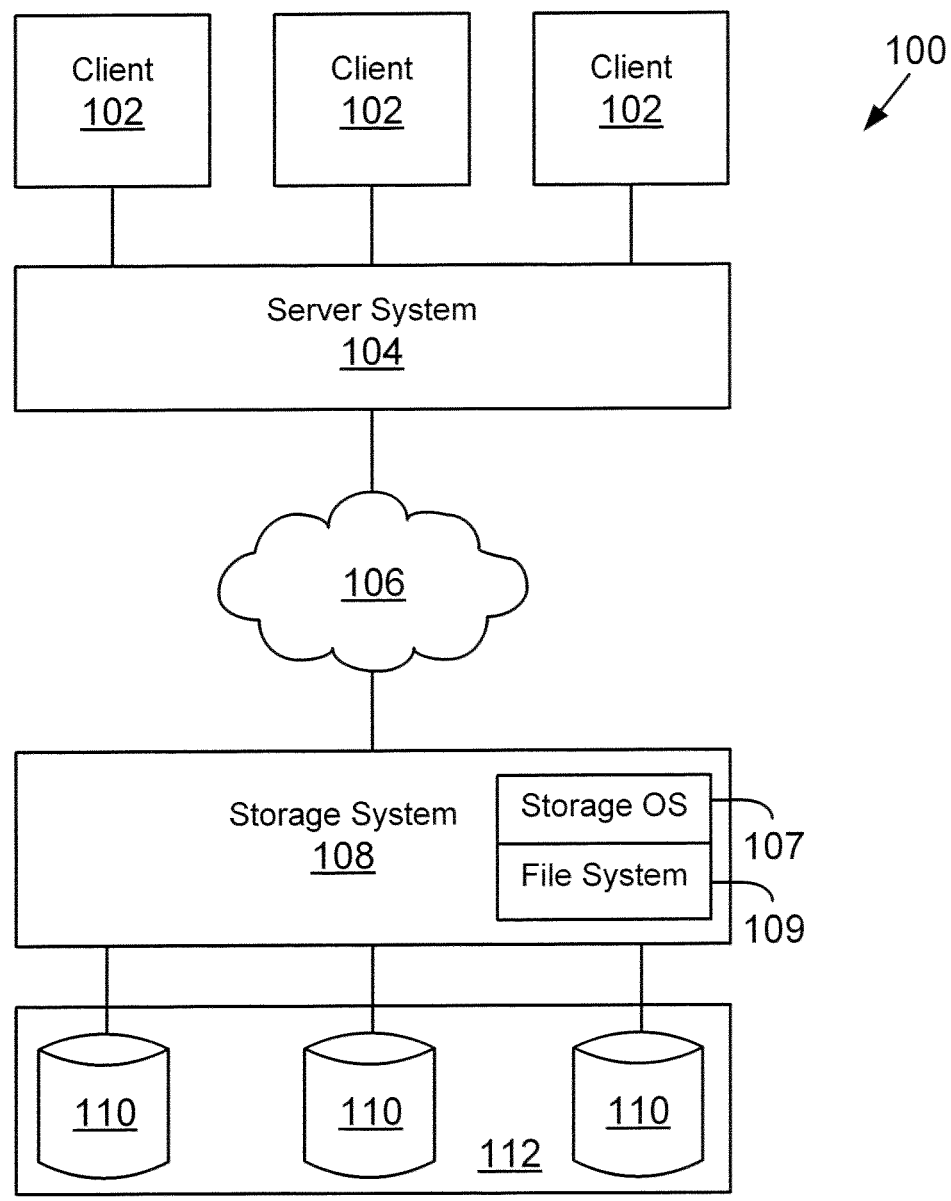
FIG. 1A shows an example of a storage environment using some of the various embodiments disclosed herein.

Storage Environment 100:

FIG. 1A is a schematic block diagram of an exemplary storage environment 100 in which some of the embodiments disclosed herein operate. The storage environment 100 comprises a server system 104 connected to multiple client computing systems 102 (also referred to as "client systems" 102) via a network (not shown). The server system 104 can be connected to client systems 102 over a network, such as a Local Area Network (LAN), Wide Area Network (WAN), or the like.

Client systems 102 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

The server system 104 can include a computing system for handling requests for data, electronic mail, file transfers, or other network services from client computing systems 102. The server system 104 may execute applications including host applications, such as backup and/or recovery type applications.

The storage environment 100 further comprises a storage system 108 having access to a set of mass storage devices 110 within a storage subsystem 112. Connection system 106 may directly couple server system 104 to storage system 108 or may be a local area network (LAN), a wide area network (WAN), metropolitan area network (MAN), or the Internet.

The storage system 108 provides a set of storage volumes to the server system 104 via connection system 106. The storage devices are presented as "logical unit number" (LUN.) A LUN may refer to a logical data container that looks like a storage device to a host (client) but which actually may be distributed across multiple storage devices by storage system 108.

The server system 104 utilizes services of the storage system 108 to store and manage information at storage devices 110. Server system 104 may request the services of the storage system 108, and the storage system 108 may return the results of the services requested by the server system 104, by exchanging packets over connection system 106. The server system 104 may issue packets using file-based access protocols, such as the Common Internet File System (CIF protocol or Network File System (NFS) protocol, over the Transmission Control Protocol/Internet Protocol (TCP/IP), when accessing information in the form of files and directories. Alternatively, the server system 104 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage system 108 executing a storage operating system 107 stores data at mass storage devices 110, preferably on one or more writable storage device media such as magnetic disks, video tape, optical, DVD, magnetic tape, non-volatile memory devices for example, flash memory devices and any other similar media adapted to store information, including data and parity information. The storage devices 110 within a volume are typically organized as one or more groups of Redundant Array of Independent (or Inexpensive) Disks (RAID).

Processors executing instructions in storage system 108 and client systems 102 communicate according to well-known protocols, such as the NFS protocol or the CIFS protocol, to make data stored on disk 110 appear to users and/or application programs as though the data were stored locally on the client systems 102. The storage operating system 107 can present or export data stored at storage devices 110 as a volume, or one or more qtree sub-volume units, to each of the client systems 102. Each volume may be configured to store data files, scripts, word processing documents, executable programs, and the like.

From the perspective of one of the client systems 102, each volume can appear to be a single disk drive. However, each volume can represent the storage space in one disk, an aggregate of some or all of the storage space in multiple disks, a RAID group, or any other suitable set of storage space.

In a typical mode of operation, one of the client systems 102 transmits one or more input/output commands, such as an NFS or CIFS request, over connection system 106 to the storage system 108. Storage system 108 receives the request, issues one or more I/O commands to storage devices 110 to read or write the data on behalf of the client system 102, and issues an NFS or CIFS response containing the requested data over the network 106 to the respective client system.

The storage operating system 107 implements a file system manager 109 for managing one or more storage volumes at storage devices 110. The file system manager 109 keeps track of a directory structure (hierarchy) of the data stored in storage devices and manages read/write operations, i.e. executes read/write operations on disks in response to client 102 requests.

The file system manager 109 may provide multiple directories in a single storage volume, each directory containing zero or more filenames. The file system provide logical/virtual representation of how data files are organized on a volume, where data files are represented as filenames that are organized in one or more directories. As used herein, the term "file" indicates a container or any other storage entity that contains a group of related data.

Information stored at storage devices 110 is typically backed up (or replicated) at one or more storage locations (not shown). A backup of a file or a file system includes copying and storage of a directory and/or tree structure of the file system.

A backup process may use image taking technology (e.g., the Snapshot™ technology provided by NetApp Inc. of Sunnyvale, Calif.) (without derogation of trademark rights of NetApp Inc.) to backup all or a portion of the file system. The image(s) can be used later during a restore process. In some embodiments, as described below, SnapManager® (without derogation of trademark rights of NetApp Inc.), a program provided by NetApp Inc. of Sunnyvale, Calif. may be used to take snapshots.

A snapshot is a persistent point in time (PPT) image of the active file system that enables quick recovery of data after data has been corrupted, to altered. Snapshots can be created by copying the data at each predetermined point in time to form a consistent image. The terms snapshot and backup are used interchangeably throughout this specification.

It is noteworthy that the adaptive embodiments described herein are not limited to using any particular imaging technology and the term snapshot as used herein includes any methodology that provides a read-only image storage space represented by a logical object any given time.

In some embodiments, the backup process produces backup information that may include metadata that is stored by storage system 108. The backup information includes information describing the backup performed on the file system (e.g., a time stamp, filenames, and/or location information). The backup information and images are used later to restore the imaged file system or a portion thereof.

A restore may be performed for a variety of reasons. For example, a restore may be performed when an error occurs in the file system, in an application, in the server or storage operating system, or in the other applications that causes a "crash" and reboot of the server system or the storage system. A restore may be performed when data in the file system have been undesirably altered, corrupted, and/or deleted, for example, by a computer virus or other malignant code. If a file has undesirably become altered, corrupted, and/or deleted, it is advantageously restored by copying and/or replacing it by using a previously stored image thereof.

The restore process is configured to restore part of the file system as described below. In some embodiments, as described below, the restore process steps are performed by various modules of server system 104. The restore process retrieves the backup information and/or image(s) for the part of the file system. The restore process then restores the part of the file system by using the backup information and/or images. The restore process may do so by deleting and replacing files of the file system with files from the backup images. Alternatively, the set of original data files may have been deleted and does not exist and thus are replaced by the retrieved backup information and images.

Typically, the storage system 108 provides a "only" copy of a snapshot. This means that one can restore the file system to the point in time when the snapshot was taken but one cannot write to the snapshot copy after the snapshot is taken. This can be a challenge for certain server environments where a writable copy may be needed. An example of one such environment is a Windows® based server environment that uses volume shadow services (VSS) provided by Microsoft Corp.

VSS may use a process called auto-recovery (also referred to herein as "recovery") to ensure that objects within a snapshot copy on the storage system stay consistent. After a snapshot is taken, server operating system modules reconcile data within the snapshot. To perform this operation, VSS uses vendor specific modules to mount a snapshot copy to the server operating system. VSS then writes data to mounted copy. This can be a challenge if the storage system only provides a read-only copy of the snapshot.

The term "mount" as used in this specification means providing a logical object (for example, a LUN) for an operation, for example, auto-recovery. The LUN appears as a drive and then one is able to perform auto-recovery, as described below with respect to FIG. 3.

As described below in more detail, the embodiments disclosed herein provide the use of a LUN clone with a read-only copy of a snapshot that can be used for auto-recovery. The embodiments disclosed herein also provide methods and systems for handling LUN clones and multiple snapshots that may be used during this auto-recovery process.

Figure 1B:
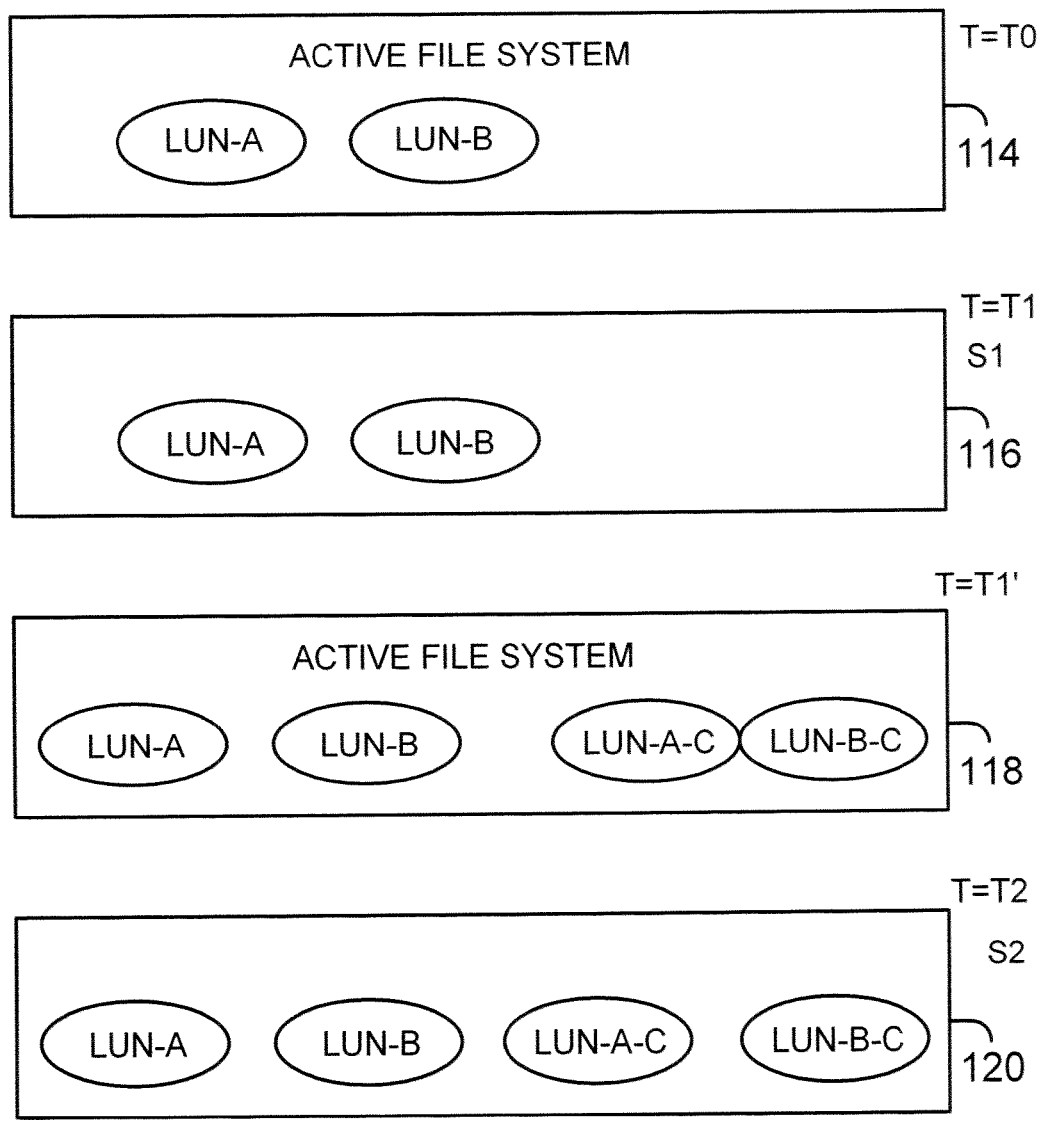
FIG. 1B shows an example of LUN-clones, as used according to one embodiment.

Before describing the methods and systems of the adaptive embodiments, the following illustrates the concept of LUN clones as used herein. FIG. 1B shows an active file system with LUN-A and LUN-B at time T0 in block 114. The active file system means that information can be read and written at time T0. At time T1 in block 116, a first snapshot (S1) is taken with LUN-A and LUN-B. Snapshot S1 is a read-only copy, i.e. one cannot write to S1.

After time T1 (shown as T1'), a LUN clone of both LUN-A and LUN-B are created by the storage operating system 107, if auto-recovery is requested for both the LUNs. The LUN clones are shown as LUN-A-C and LUN-B-C in block 118. One can write to the LUN clones after time T1'. A second snapshot (S2) is then taken at time T2 (block 120) after information is to the LUN clones. Snapshot 52 includes the LUN clones with the information written after S1 was created. After S2 is created, the LUN clones may be deleted from the active file system (block 114).

As illustrated in FIG. 1B, the backup operation has two snapshots, S1 and S2, where S2 includes the information written to the LUN clones. The embodiments disclosed herein illustrate how the two snapshots are handled.

The LUN clone methodology described above is different from creating Flexclones using the Flexclone® technology provided by NetApp®, Inc. (without derogation of any trademark rights of NetApp® Inc. To create a Flexclone, typically, one starts with a storage volume and then creates a snapshot copy. Thereafter, a new clone (Flexclone) is created that is based on the snapshot copy. When the original volume is modified, the Flexclone volume is also modified. When the Flexclone is created, the operation locks the snapshot backing the Flexclone until the Flexclone has been deleted.

The embodiments disclosed herein provide techniques selecting between LUN clones and Flexclones for performing auto-recovery, as described below in more detail.

Figure 2A:
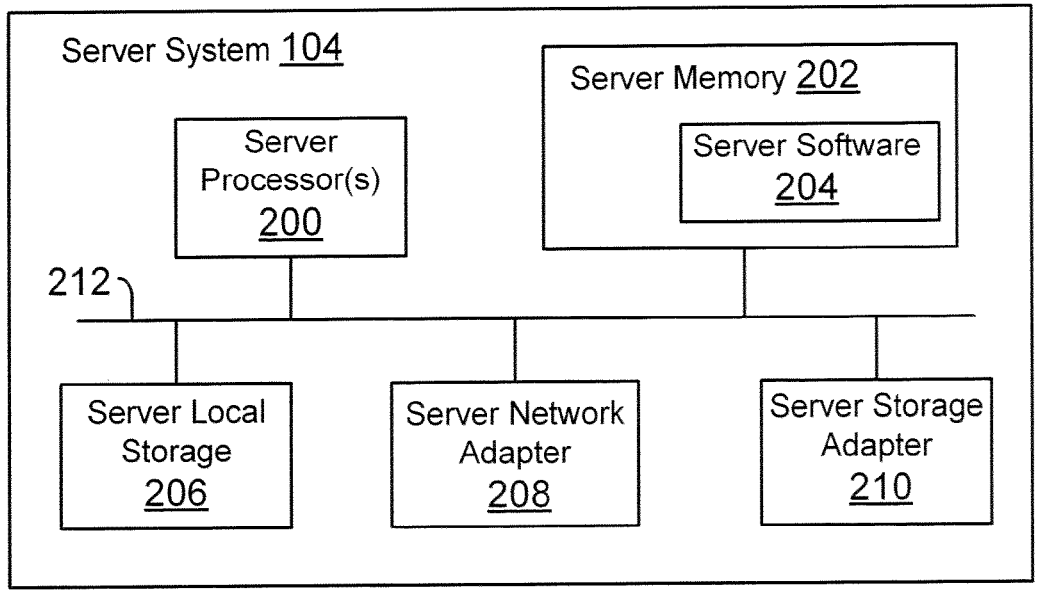
FIGS. 2A-2B show examples of a server based computing system used according to one embodiment.
Figure 2B:
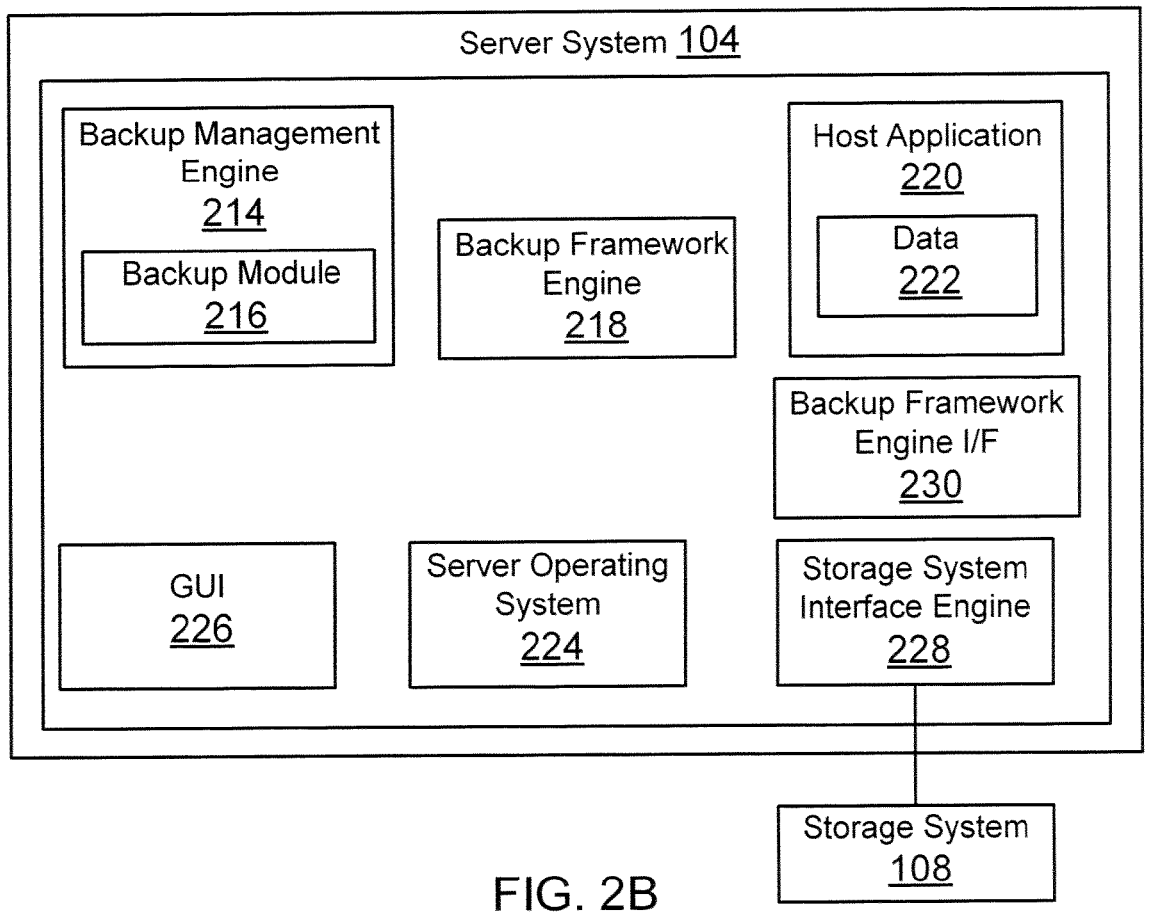

Server System:

Before describing the various methods for handling snapshots, the following provides a brief description of server system 104 with respect to FIGS. 2A-2B. Note, certain standard components used by server system 104 that are not germane to the embodiments disclosed herein have not been described.

The server system 104 comprises server processor(s) 200, a server memory 202, a server network adapter 208, a server storage adapter 210, and a server local storage 206 coupled by a bus system 212. The bus system 212 is an abstraction that represents any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an institute of Electrical and Electronics Engineers (IEEE) standard 1394 bus (sometimes referred to as "Firewire").

The server processors 200 are the central processing units (CPUs) of the server system 104 and, thus, control the overall operation of the server system 104. In certain embodiments, the server processors 200 accomplish this by executing programmable instructions out of server memory 202. The server processors 200 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The server memory 202 comprises storage locations that are addressable by the processor 200 and adapters, for example, the server network adapter 208 and the server storage adapter 210. The storage locations are for storing executable instructions that preferably include server software 204. The server processor 200 and the server adapters may, in turn, comprise processing elements and/or logic circuitry configured to execute the programmable code and manipulate various data structures.

The server memory 202 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein.

The server network adapter 208 comprises a plurality ports adapted to couple the server system 104 to one or more client systems 102 (shown in FIG. 1A) over point-to-point links, wide area networks, virtual private networks implemented over a public network (Internet) or a shared local area network. The server network adapter 208 thus may comprise the mechanical, electrical and signaling circuitry needed to connect the node to the network.

The server storage adapter facilitates access to the storage devices 110 (shown in FIG. 1A). The server storage adapter 210 comprises a plurality of ports having input/output (I/O) interface circuitry that couples to the devices 110 over an I/O interconnect arrangement, such as a conventional high-performance, fibre channel link topology.

In one embodiment, server network adapter 208 and server storage adapter 210 may be integrated into a single converged adapter that can handle both network and storage traffic. An example of such a converged adapter is a Fibre Channel over Ethernet (FCOE) adapter.

The server system 104 also has access to local storage 206 which is a mass storage device that may store information within the server system 104, such as executable instructions 204 (also referred to as server software 204), the server operating system 22 (FIG. 2B) and/or data. The server system 104 loads server software 204 into the server memory 202 from which they are accessed by the server processors 200. The server local storage 206 may be or may include any conventional medium for storing large volumes of data in a non-volatile manner, such as one or more magnetic or optical based disks, flash memory and other types of storage devices.

FIG. 2B shows an example of an architecture used by the server system 104 of FIG. 2A. In some embodiments, the server system 104 executes a server operating system 224; one or more host application(s) 220, which may use data 222 or database; a backup management engine 214 having or interfacing with a backup module 216; a user interface engine (GUI) 226; backup framework engine 218; a storage system interface engine 228; and a backup framework engine interface 230.

The server operating system 224 includes executable instructions that are executed out of server memory 202 for managing host applications and other operations. The server operating system 224 can be, for example, UNIX®, Windows NT®, Linux®, or any other operating system.

The host application(s) 220 can be any application used for servicing client 102 requests. Host applications 220 may include an email server application, a database management application and other applications.

Information stored in storage devices 110 and managed by storage system 108 may be backed up by the backup management engine 214. The backup-management engine 214 using backup module 216 may initiate a backup of a file and/or file system e.g., by sending a command to the storage system 108 via the storage system user interface engine 228 and the backup framework engine 218. The storage operating system 107 (shown in FIG. 1A) of storage system 108 generates one or more images relating to the file system to backup all or portion of the file system e.g., a single file, multiple files, a drive, a disk, multiple drives or disks, and/or one or more volumes including multiple drives.

After the backup is performed, the storage operating system 107 notifies the backup management engine 214 that the backup operation is completed. In some embodiments, as described above, a restore operation is later performed by using the generated images, and/or the backup information.

For each backup, the backup management engine 214 may also cause the storage system 108 to generate backup information that is stored to the storage system 108. The backup information may be in the form of metadata, and may include information about a backup, for example, identification for the backup, a time stamp when the backup was performed, and filenames, directory locations on the storage device(s) 110, and/or the directory path where backups are stored. The backup information may be used later to restore the file system and/or portions thereof, for instance, in case of a system crash, data corruption, virus, or a similar occurrence.

In some embodiments, the backup management engine module 216 uses image taking technology (e.g., Snapshot™ technology provided by NetApp® Inc. of Sunnyvale, Calif.) to backup all or a portion of the file system. In some embodiments, the backup module 216 includes SnapManager®, program provided by NetApp®, Inc. of Sunnyvale, Calif. take snapshots.

In some embodiments, the backup management engine 214 also includes a clone module (not shown) that implements clone technology (e.g., the LUN clone technology and Flexclone® technology provided by NetApp®, Inc.) (without derogation of any trademark rights of NetApp® Inc.) to mount snapshots, according to one embodiment. The LUN clone and Flexclone methodologies have been described above with respect to FIG. 1B.

The backup framework engine 218 may be used to help implement backup functions. More specifically, the backup framework engine 218 may be used to help integrate the various backup components of the host application 220, the backup management engine 214, and/or the storage system interface engine 228. The backup framework engine 218 may also interact with these various components to produce the backup. In some embodiments, the backup framework engine 218 includes a VSS layer, a software module provided by Microsoft Corp. of Redmond, Wash.

Server system 104 also executes a backup framework engine interface 230 to interface between backup framework engine 218 and storage system interface engine 228. In another embodiment, interface 230 may be integrated with interface 228. In an environment using VSS, interface 230 may be referred to as a VSS hardware provider layer that is provided by a vendor that provides interface 228/storage system 108. The VSS hardware provider layer interfaces with the VSS layer that is a part of backup framework engine 218 and the storage operating system 107 via storage system interface engine 228. In another embodiment, the VSS hardware provider layer and the storage system interface may be integrated into a single module.

The storage system interface engine 228 may be configured to act as an interface between the server system 104 and the storage system 108. The storage system interface engine 228 communicates with the storage system 108 by using, for example, a Zephyr Application and Programming Interface (ZAPI) protocol. In particular, the storage system interface engine 228 interacts with the backup management engine 214 and/or backup framework engine 218 to receive and perform requests made by the backup management engine 214 by interacting with other software programs of the server system 104 or the storage system 108.

In some embodiments, the storage system interface engine 228 includes SnapDrive® (without derogation of trademark rights of NetApp Inc.), a program provided by NetApp Inc. of Sunnyvale, Calif. for interfacing with SnapManager® and the storage operating system that is described below. It is noteworthy that the adaptive embodiments described herein are not limited to using SnapDrive®, any other module may be used for interfacing with the storage operating system.

The following provides a brief description of VSS as provided by the Windows Server Operating system. VSS may coordinate backup operations with applications that may be running on the server system 104 as well the storage system 108. Typically, a requester (for example, SnapManager for Microsoft Exchange or Hyper-V (used in a virtual environment that is described below) requests a backup operation. The request is received by VSS (backup framework engine 218) that communicates with VSS writers (for example, applications 220) to stop any read/write operations.

The VSS then freezes the server file system, for example, NTFS to block all input/output operations. The VSS then initiates a backup operation to the VSS providers (230). There may be two types of providers, a system VSS provider that comes with the server operating system and a hardware provider that communicates with storage system 108. The system provider creates the server file system snapshot. The hardware provider is provided by the entity that provides the storage system 108. For example, NetApp Inc. may be one of the hardware providers. As an example, SnapDrive® (228) and the hardware provider 230) may be packaged together as a single module.

Figure 3:
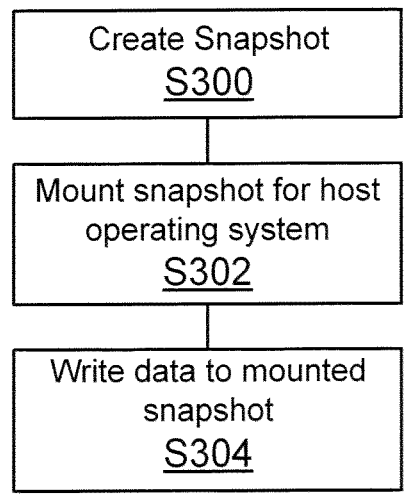
FIG. 3 shows a process flow diagram for performing auto-recovery.

FIG. 3 shows a process flow diagram for performing auto-recovery (also referred to herein as "recovery") in an environment that uses VSS or where a writable snapshot may be needed. The term auto-recovery as used throughout this specification is not to be construed as being limited to any particular operating environment, for example, an environment using VSS. The concept of auto-recovery or "recovery" may be applicable in any environment where a writable backup copy of a storage space may be needed and where one has to reconcile differences between a backup copy and information stored at the storage space after the backup copy is used.

The process begins in block 6300 when a volume may be replicated, for example, by taking a snapshot. The snapshot is taken by the storage operating system 107 when requested by a backup module 216. The snapshot is then mounted for a host server operating system in block S302. The snapshot may be mounted by using storage system interface engine 228. Thereafter, data may be written to the mounted snapshot in block S304.

Virtual Machine Environment:

The adaptive embodiments involving auto-recovery disclosed herein may be used in a virtual environment where a physical resource is logically partitioned, such that the underlying hardware of the physical resource is time-shared and appears as one or more independently operating virtual machines (VMs). Each VM may function as a self-contained platform, running its own operating system (OS) and application software. The software running in a VM is collectively referred to herein as "guest software." In addition, resources available within the VM may be referred to herein as "guest resources."

The guest software expects to operate as if at were running on a dedicated computer rather than in a VM. That is, the guest software expects to control various events and have access to hardware resources on a host platform (e.g., physical machine) which may be referred to herein as "host hardware resources." The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform such as a storage system.

Figure 4B:
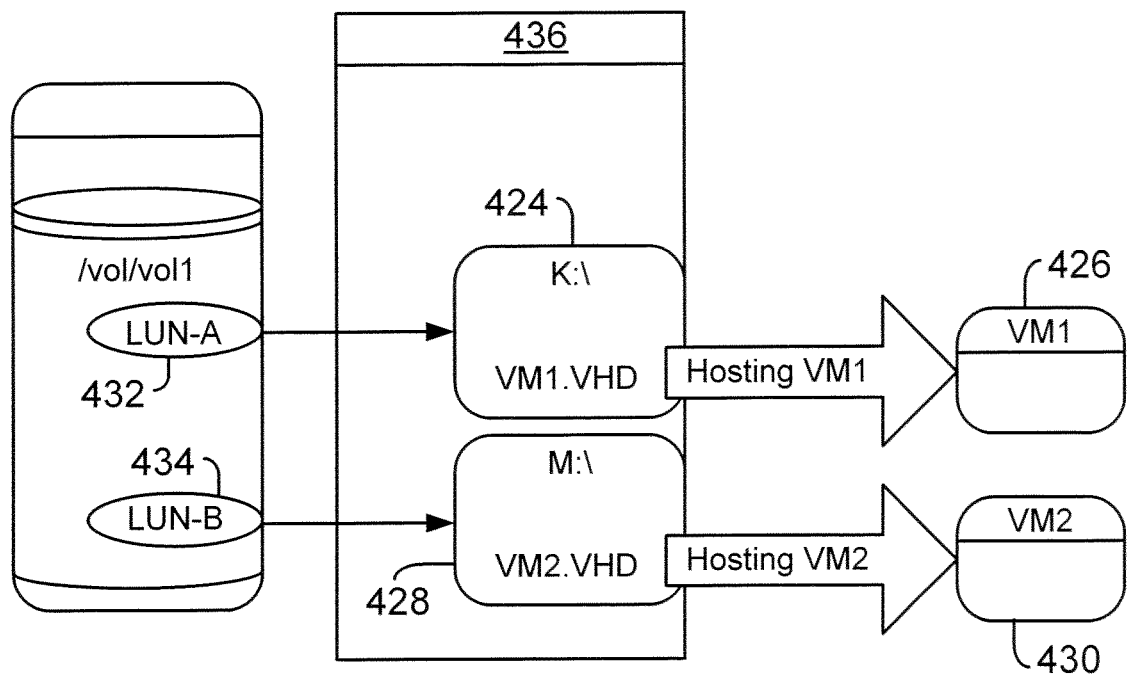
FIGS. 4A-4B and 5 show examples of a virtual environment using the embodiments disclosed herein.
Figure 4A:
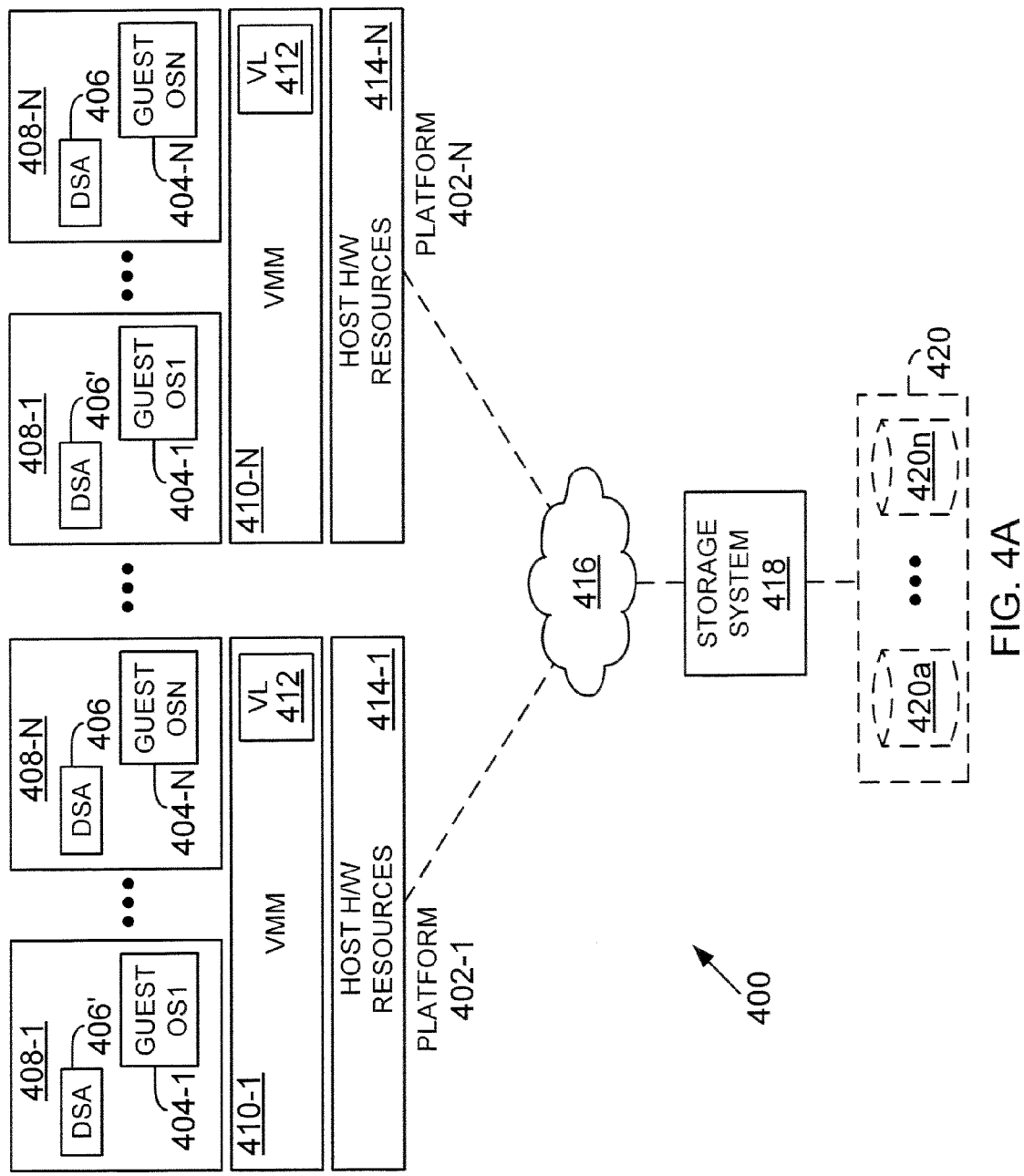

FIG. 4A shows an example of a virtual machine environment 400 (may also be referred to as system 400) having a plurality of host platforms 402 (shown as 402-1 . . . 402-N) communicably coupled to a storage system 418, (similar to storage system 108 shown in FIG. 1A) via a network 416 (similar to network 106, FIG. 1A), such as a local area network (LAN). Each host platform 402 may be, for example, a conventional personal computer (PC), workstation, server system, or the like. As described herein, the term "communicably coupled" may refer to a direct connection, network connection, or other connections to enable communication between devices.

In one embodiment, host platforms 402 can access storage subsystem 420 via storage system 418. Storage subsystem 420 may include a set of mass storage devices 420*a*-420*n* (similar to 110 of FIG. 1A). The storage devices may be made available by storage system 418 as LUNs.

Each host platform 402 includes a virtual execution environment 408 (408-1 . . . 408-N). Each virtual execution environment 408 may execute an operating system (OS) that may be referred to herein as a guest OS 404 (404-1 . . . 404-N). The operating systems or OS 404 of virtual execution environment 408 are referred to as guest operating systems since they receive a limited view of the hardware (H/W) resources 414

(414-1 ... 414-N) which may include CPU, memory, I/O devices, storage or other hardware resources.

Host platforms 402 may also include a virtual machine monitor (VMM) (may also be referred to as a hypervisor layer) 410 (410-1 ... 410-N). VMM 410 creates a virtual execution environment or VM that runs on the host platform to facilitate, for the guest OS or other software applications, the abstraction of one or more VMs. Each VMM 410 may include or interface with a virtualization layer (VL) 412 that provides one or more virtualized hardware resources for each virtual execution environment.

Each virtual execution environment 408 may further include a data storage application (DSA) 406 to enable certain operations on storage system 418. In one embodiment, DSA 406 is a storage utility that enables the LUNs or data storage devices managed by storage system 418 to appear as locally attached, physical disks of a host platform. DSA 406 may enable backup, verify, and restore data functionality on storage system 418. DSA 406 may include SnapDrive®, a program provided by NetApp Inc. of Sunnyvale, Calif.

It is noteworthy that various vendors provide virtualization environments, for example, VMware Corporation, Microsoft Corp. and others. The generic virtualization environment described above with respect to FIGS. 4A and 4B may be customized depending on the virtual environment provider.

FIG. 4B shows an example of a Hyper-V server 436 provided in a Microsoft Corp. provided virtual server environment. The hyper-v server 436 may also be referred to as a parent operating system that hosts a plurality of VMs. Hyper-V server 436 presents a LUN (e.g., LUN-A) 432 as drive (VM1-VHD) 424 to a VM (e.g., VM1) 426 and a LUN (e.g., LUN-B) 434 as drive (VM2-VHD) 428 to VM (VM2) 430. LUNs 432 and 434 may be managed by storage system 418.

Figure 5:
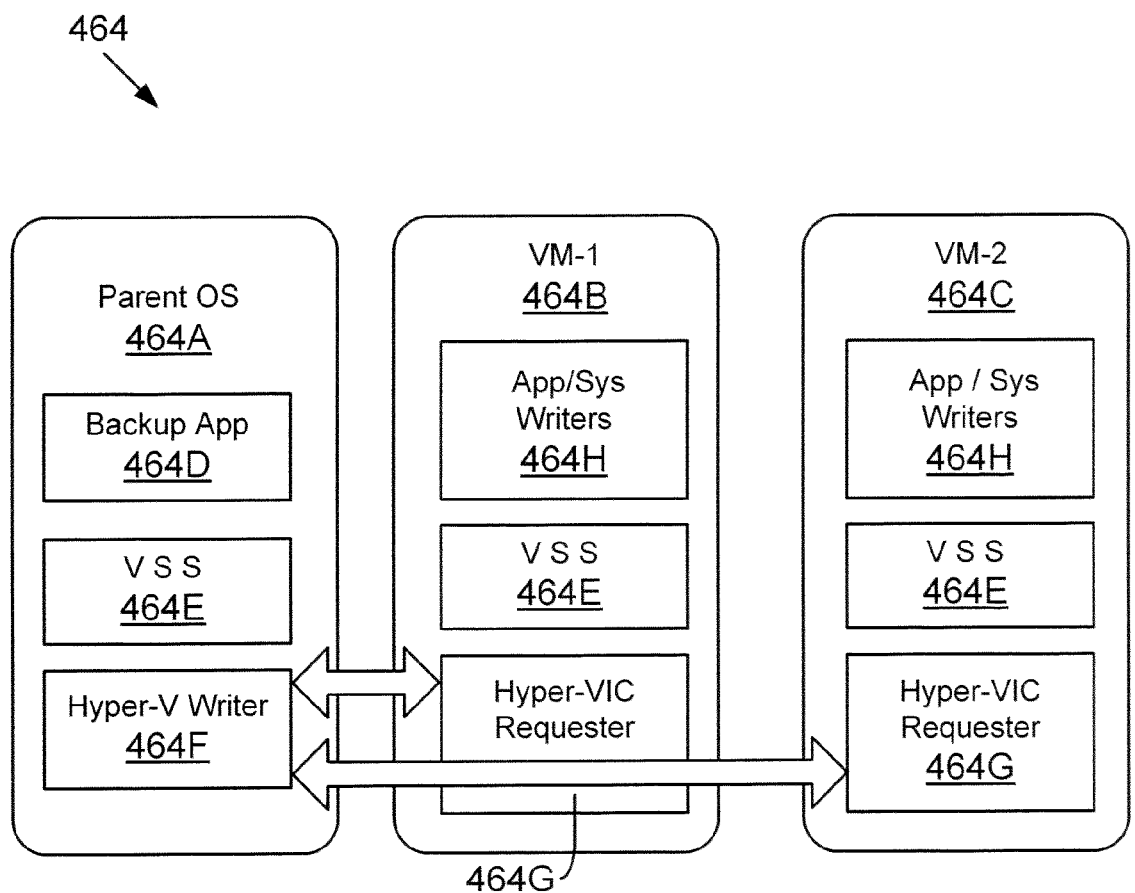

FIG. 5 shows a block diagram of a Microsoft virtual environment 464 where auto-recovery is typically always needed and where the adaptive embodiments can be used effectively. It is noteworthy that the embodiments disclosed herein are not limited to environment 464 and can be used in any environment where a writable snapshot is needed for an operation similar to auto-recovery that has been described above.

Environment 464 includes a parent operating system (Parent OS) 464A (similar to 436, FIG. 4B) that manages and co-ordinates activities between guest OS 464B and 464C (shown as VM-1 and VM-2, respectively). VM-1 and VM-2 also execute applications 464H that may be used to read and write information to a storage device that is presented to the virtual machines.

The parent OS, VM1 and VM2 also execute a VSS layer 464E, similar to backup framework engine 218 that has been described above. The parent OS also includes Hyper-V writer 464F, a module that coordinates backup operations for VM1 and VM2 by communicating with Hyper-V requester module 464G executed by each virtual machine.

The parent application executes a backup application, similar to backup module 216 (FIG. 2) that may request backup for all virtual machines. Hyper-V writer 464F communicates with each virtual machine. A virtual machine snapshot is first taken by the Windows system provider that captures the snapshot within the guest OS. A second storage system snapshot may be taken by the storage system. The virtual machine and storage system snapshots may no consistent due to a time lag between the snapshots. Hyper-V writer 464F uses auto-recovery to reconcile the snapshots. The processes described below can be used to reconcile the snapshots in a virtual environment, according to one embodiment.

Figure 6A:
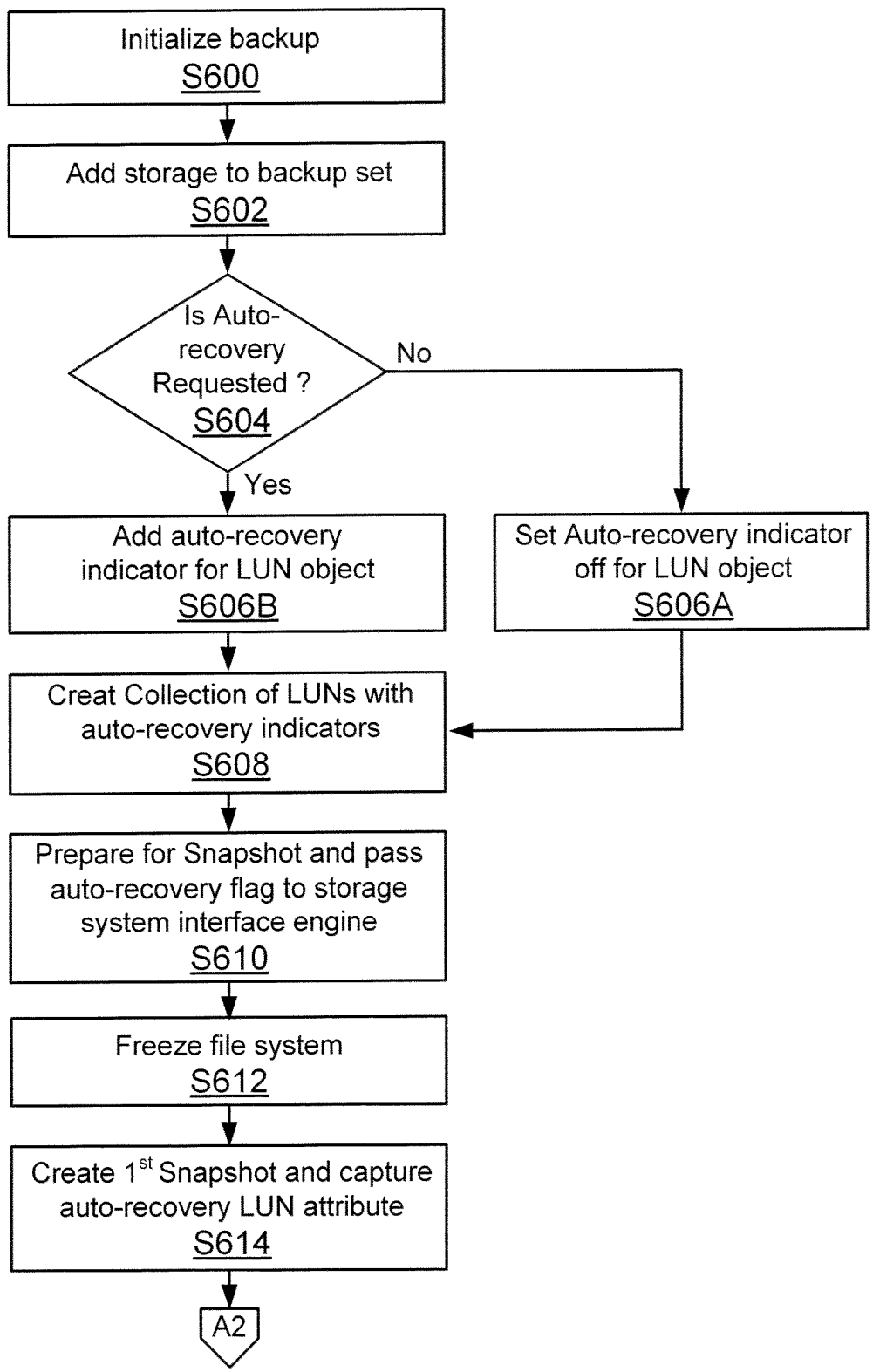
FIGS. 6A-6D, 7 and 8A-8B show process flow diagrams, according to the embodiments disclosed herein.

Process Flow:

FIG. 6A shows a backup process using auto-recovery, according to one embodiment. The process begins in block S600 when a backup operation is initialized for a LUN managed by a storage system. Backup may be initiated by a backup application, for example, backup module 216 (FIG. 2A), backup framework engine 218 (FIG. 2A) or backup application 464D (FIG. 5) in a virtual environment.

In block S602, the LUN is added to a backup set. The backup set identifies storage or LUNs that need replicated or "backed up". Once the LUN is added to the back set, storage system interface engine 228 detects a backup context. The backup context is provided by the backup framework engine 218 to interface 230. The backup context can be used to define backup attributes, including size of information that is to be backed up, identity of storage that is being backed up and destination. Backup context may vary from one storage environment.

In block S604, storage system interface engine 228 detects if auto-recovery is being requested in the backup context. Auto-recovery may be requested by a user via backup framework engine 218. If auto-recovery is not requested, then in block S606A, an indicator for auto-recovery (also referred herein as "recovery indicator") may be set to an off value. The indicator indicates that no auto-recovery is needed for the storage that was added in block S602. In one embodiment, an object representing a LUN may be used to provide LUN attributes. A flag for the LUN object may be set to a particular value to indicate that auto-recovery is off.

If auto-recovery is requested, then in block S606B, an indicator is set to a value to indicate that auto-recovery is being requested for the storage that was added in block 602. The indicator is set for the LUN object In block S608, one or more LUNs for which auto-recovery is requested are identified and grouped. In one embodiment, in a VSS based environment, the VSS hardware provider layer may perform this task.

In block S610, the storage system interface engine 228 prepares for creating a backup, for example, taking a snapshot. The auto-recovery flag is provided to storage system interface engine 228. Thereafter, in block S612, the file system is frozen by the backup framework engine 222. In an environment that uses VSS, the file system is frozen by VSS such that the applications cannot write to the affected LUNs during backup.

In block S614, a first snapshot (also referred to herein as the first read-only copy or "first replicated read-only copy) is generated and the auto-recovery indicator, if set, is also captured as a LUN attribute. If there is no auto-recovery, then in block S616, the backup is completed and metadata associated with the backup is returned to the backup framework engine 218. The metadata includes attributes regarding the backup, including location, size and other properties of the snapshot.

If auto-recovery is indicated for the LUN involved in the backup operation of S614, then in block S618, backup framework engine 218 requests the storage system interface engine 228 to mount the LUN for auto-recovery. Block S614 is described below in detail with respect to FIG. 6B.

In block S620, depending on a LUN attribute either a LUN clone or Flexclone is used for mounting the snapshot LUN. Storage system interface engine 228 checks for the auto-recovery flag. If the flag is set, then a LUN clone is used, otherwise, a Flexclone is used. Block S620 is described below in detail with respect to FIG. 6C. Thereafter, auto-recovery is completed in block S622.

In block S624, backup framework engine 218 requests storage system interface engine 228 to dismount the LUN that was mounted in block S622. A second snapshot (also referred to herein as the second read-only copy or "second replicated read-only copy) is then initiated in block S626 to capture any changes that may have occurred in the LUN clone. The second snapshot is taken in block S628. In block 5630, the LUN clone is deleted and the process ends in block S632.

Figure 6B:
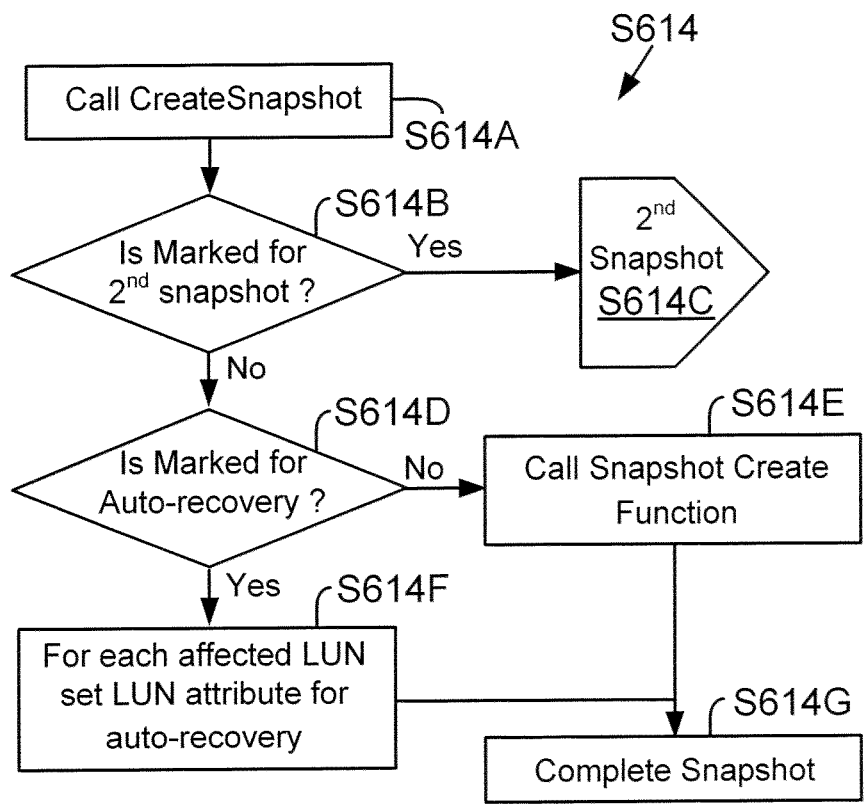

Referring now to FIG. 6B a process for creating a snapshot with auto-recovery is provided. The process starts in block S614A with a call for creating a snapshot. The call is provided to storage system interface engine 228 by interface 230. In block S614B, the storage system interface engine 228 determines whether the request is marked for a second snapshot. If yes, then the process moves to S614C that shows how a second snapshot is created with respect to FIG. 6D.

If the request is not for a second snapshot, then the storage system interface engine 228 determines if auto-recovery is marked for the request in S614D. If there is no auto-recovery, then in block S614E a standard snapshot is initiated and the process ends in block S614G.

If auto-recovery is marked in block S614D, then storage system interface engine 228 sets a LUN attribute indicating auto-recovery, for example, "AUTORECOVERY-REQUESTED" may be set to "yes". This attribute is used to determine how to mount snapshot LUNs, as described below. Thereafter, the process moves to block S614G where the snapshot is completed.

Figure 6C:
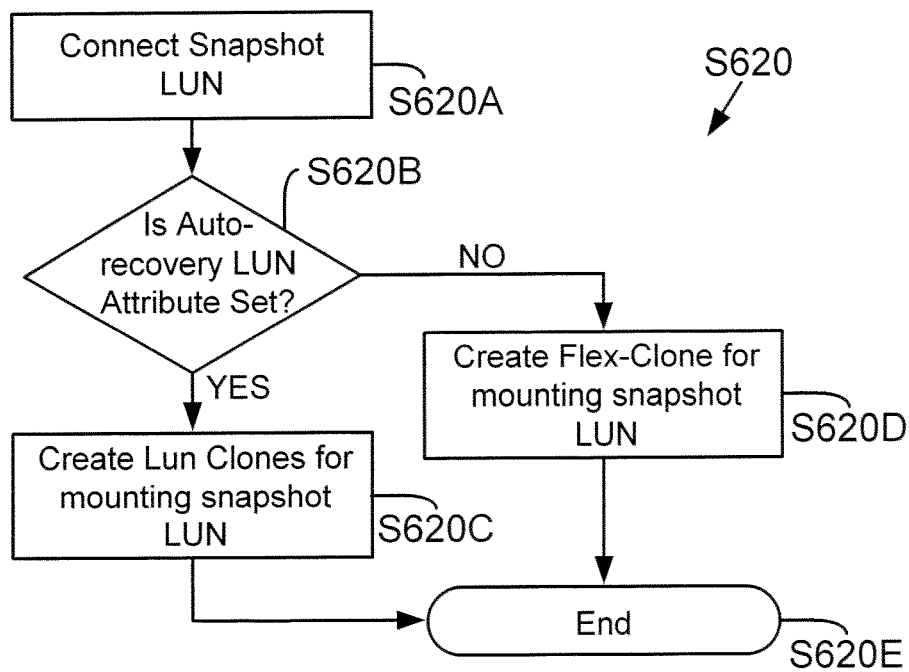

FIG. 6C shows a process flow diagram for block S620, The process starts in block S620A where storage system interface engine 228 receives a request for connecting the snapshot LUN. Storage system interface engine 228 then determines if an auto-recovery flag is set in the LUN attribute in S620B. If the auto-recovery flag is not set, then a Flexclone is created in block S620D. If the auto-recovery flag is set, then a LUN clone is created for mounting the snapshot LUN in S620C. The process ends in block S6205.

Figure 6D:
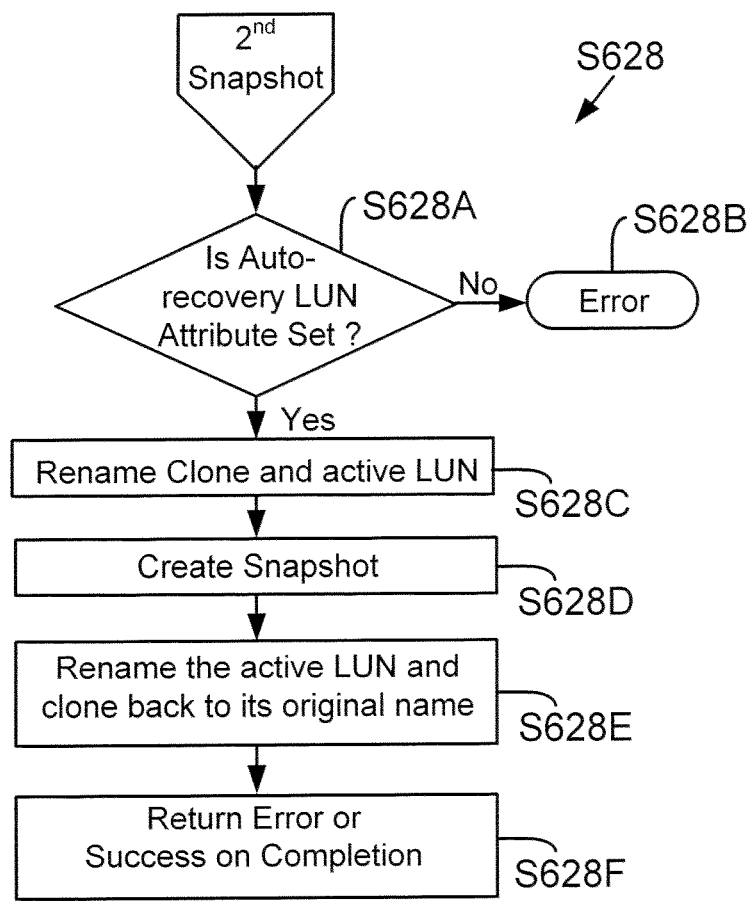

FIG. 6D shows a process flow diagram for creating a second snapshot, according to block S628 of FIG. 6A. The process starts with a determination in block S628A whether auto-recovery LUN attribute is set. If the attribute is not set, then an error message is generated in block S628B.

If the attribute is set, then in block S628C, the LUN clone and the active LUN for the snapshot are renamed. In one embodiment, the clone is renamed as the original LUN and the original LUN name is modified so it is different from the LUN clone.

In block S628D, the second snapshot with the LUN clone is taken. Thereafter, in block S628E, the LUN clone and the LUN are renamed to their previous names, i.e. before they were renamed in block S628C. An error or success message is generated in block S628F.

Figure 7:
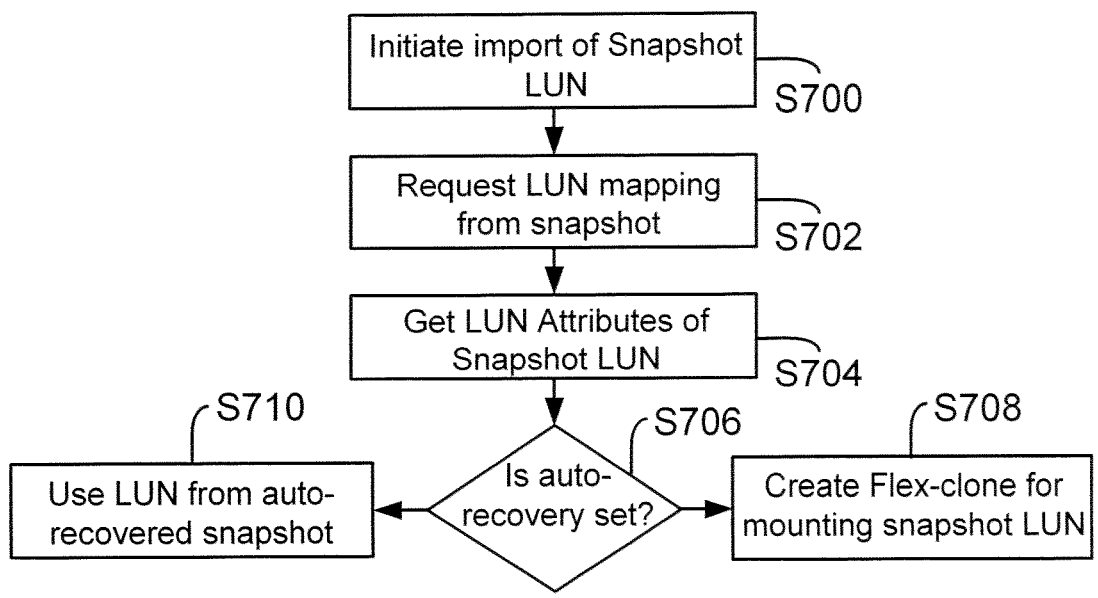

FIG. 7 provides a process flow diagram for importing an auto-recovered shadow copy (i.e. snapshot copy), according to one embodiment. The process begins in block 8700 when backup management engine 214 initiates a backup session using saved backup metadata. In block S702, a LUN mapping request is sent to storage system interface engine 228 and/or interface 230. In block S704, the storage system interface engine 228 gets LUN attributes for the snapshot LUN and determines in block S706, if an auto-recovery flag is set. If the auto-recovery flag is not set then in block S708, a Flexclone is created for mounting the requested LUN. If the auto-recovery flag is set, then in block S710, a Flexclone is created to mount the LUN from the second snapshot.

Figure 8A:
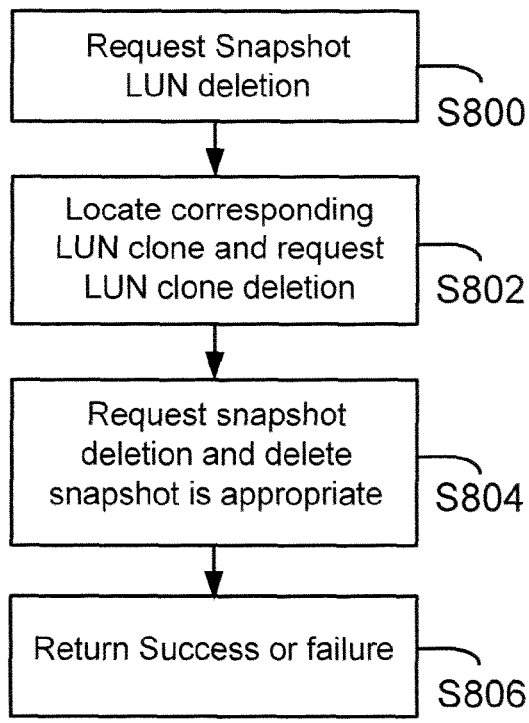

FIG. 8A shows an overall process flow diagram for deleting a snapshot after auto-recovery, according to one embodiment. The process begins in block S800 when a request to delete a snapshot LUN is initiated. The request may be initiated by backup framework engine 218. The LUN clone associated with the snapshot is located in block S802 and the storage system interface engine 228 is requested to delete the LUN clone in block S804, which is described below with respect to FIG. 8B. Thereafter, an error or success message is generated in block S806.

Figure 8B:
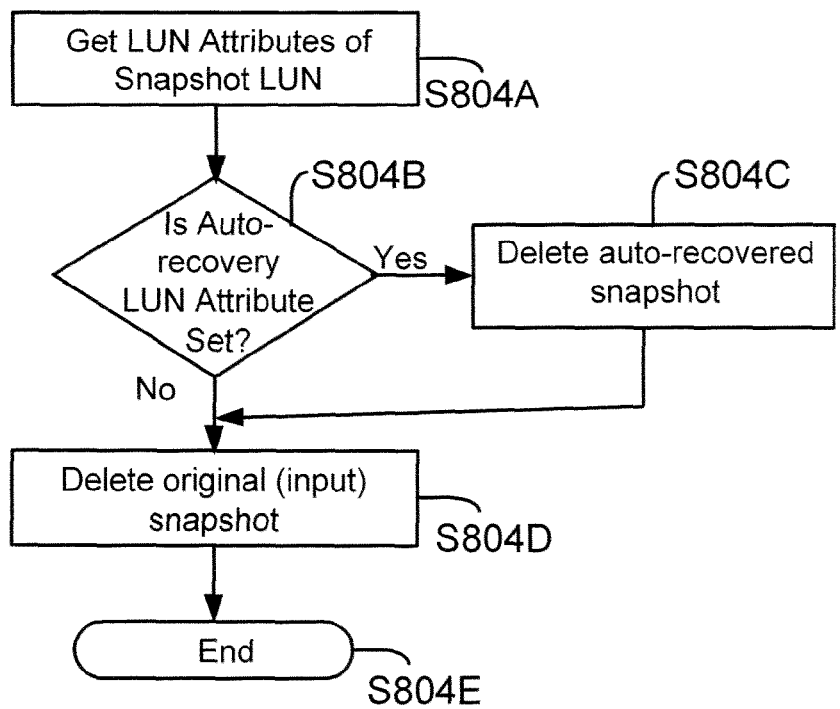

FIG. 8B shows a process flow diagram for block S804, according to one embodiment. The process flow begins in block S804A when storage system interface engine 228 obtains the LUN attributes associated with the snapshot LUN. Based on the LUN attributes, in block S804B, the storage system interface engine 228 determines if auto-recovery is set. If set, the auto-recovered snapshot is deleted in S804C. Thereafter, the input (or the first snapshot) is deleted in block S804D. If auto-recovery is not set, the input (or the first snapshot) is deleted in block S804D. The process then ends in block S804E.

Storage System:

FIG. 9A illustrates various components of the storage system 108, in accordance with some embodiments. Specifically, the storage system comprises one or more processors 900a and/or 900b, a memory 902, a network adapter 908, and a storage adapter 910 interconnected by a bus system 912. The bus system 912 may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The storage system 108 executes a storage operating system 904 (similar to 107, FIG. 1A) with a file system manager 906 (similar to 109) out of memory 902. Memory 902 comprises storage locations that are addressable by the processors (900a/900b) and adapters (for example, 908 and 910) for storing software code and data structures. The processor and adapters may, in turn, comprise processing elements and/or logic circuitry configured to execute the software code and manipulate various data structures.

The network adapter 908 comprises a plurality of ports adapted to couple the storage system 108 to one or more server systems 104 over point-to-point links, wide area networks, virtual private networks implemented over a public network (Internet), or a shared local area network. The network adapter 908 thus may comprise mechanical, electrical and signaling circuitry.

The storage adapter 910 cooperates with the storage operating system 900 to access information requested by the server system 104. The storage adapter 910 comprises a plurality of ports having input/output (I/O) interface circuitry that couples to the disks over an I/O interconnect arrangement, such as a conventional high-performance, FC link topology.

In one embodiment, storage network adapter 908 and storage adapter 910 may be integrated into a single converged adapter that can handle both network and storage traffic. An example of such a converged adapter is a Fibre Channel over Ethernet (FCOE) adapter.

The storage operating system 904 portions of which are typically resident in memory 902 and executed by the processing elements, functionally organizes the storage system 108 by, inter alia, invoking storage operations in support of the storage service implemented by the storage system 108. It will be apparent to those skilled in the art that other processing and memory means, including various computer readable media, may be used for storing and executing program instructions pertaining to the invention described herein. As illustrated, the storage operating system 904 may comprise the Data ONTAP® operating system available from NetApp Inc., of Sunnyvale, Calif. that implements a Write Anywhere File Layout (WAFTED) file system. However, it is expressly contemplated that any appropriate file system may be enhanced for use in accordance with the inventive principles described herein. As such, where the term "WAFL" is employed, it should be taken broadly to refer to any file system that is otherwise adaptable to the teachings of this invention. As used herein, the term "storage operating system" generally refers to the computer-executable code operable on a computer that manages data access.

In one embodiment, storage system 108 may have a distributed architecture; for example, it may include a separate N-("network") blade and D-(disk) blade (not shown). In such an embodiment, the N-blade is used to communicate with server system 104, while the D-blade includes the file sys functionality and is used communicate with the storage devices 110 that are a part of a storage sub-system. The N-blade and D-blade communicate with each other using an internal protocol. Alternatively, storage system 108 may have an integrated architecture, where the network and data components are all contained in a single box. The storage system 108 further may be coupled through a switching fabric to other similar storage servers (not shown) which have their own local storage subsystems. In this way, all of the storage subsystems can form a single storage pool, to which any client of any of the storage servers has access.

Figure 9B:
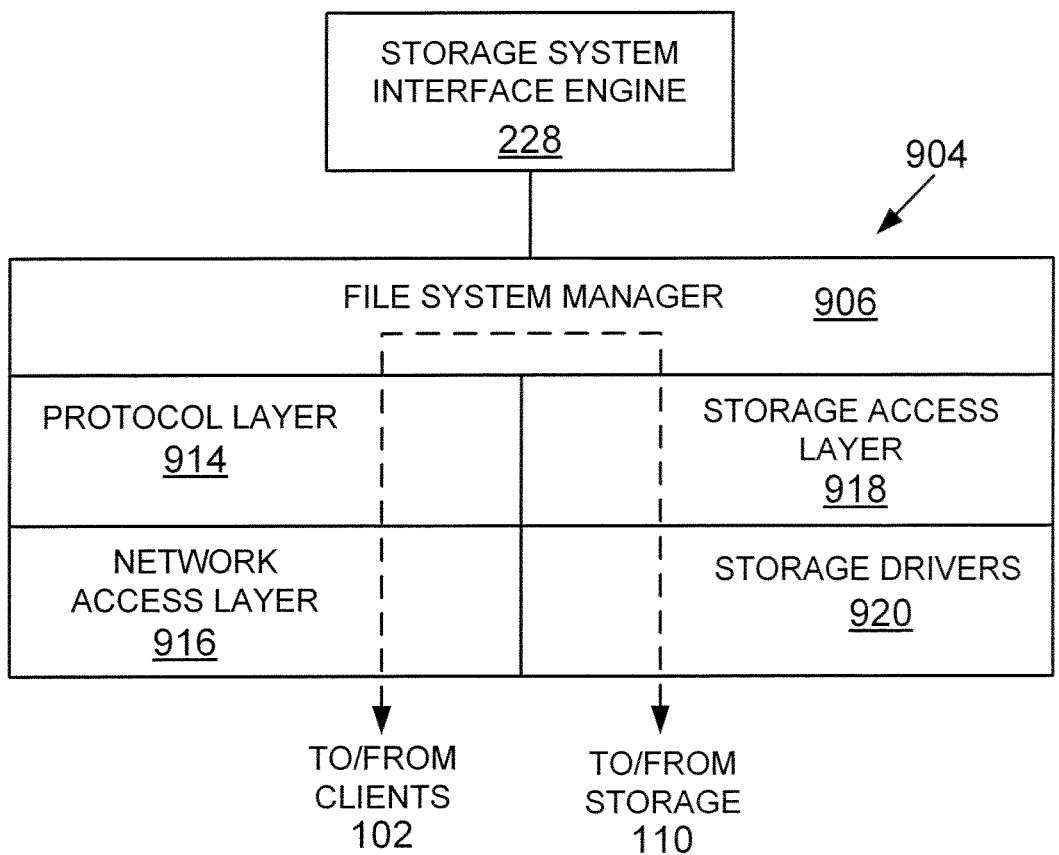
FIG. 9B shows an example of an operating system the storage system of FIG. 9A.

Storage Operating System:

FIG. 9B illustrates a generic example of an operating system 904 executed by storage system, according to one embodiment of the present disclosure. In one example, operating system 904 may include several modules, or "layers". These layers include a file system manager 906 (similar to 109) that keeps track of a directory structure (hierarchy) of the data stored in storage devices and manages read/write operations, i.e. executes read/write operations on disks in response to client 102 requests.

Operating system 904 may also include a protocol layer 914 and an associated network access layer 916, to allow storage system 108 to communicate over a network with other systems, such as server system 104. Protocol layer 914 may implement one or more of various higher-level network protocols, such as NFS, CIFS, Hypertext Transfer Protocol (HTTP), TCP/IP and others, as described below.

Network access layer 916 may include one or more drivers, which implement one or more lower-level protocols to communicate over the network, such as Ethernet. Interactions between client systems 102 and mass storage devices 110 are illustrated schematically as a path, which illustrates the flow of data through operating system 904.

The operating system 904 may also include a storage access layer 918 and an associated storage driver layer 920 to allow storage system 108 to communicate with a storage device. The storage access layer 918 may implement a higher-level disk storage protocol, such as RAID while the storage driver layer 920 may implement a lower-level storage device access protocol, such as FC or SCSI. In one embodiment, the storage access layer 918 may implement the RAID protocol, such as RAID-4 or RAID-DP™ (RAID double parity for data protection provided by NetApp Inc. the assignee of the present disclosure).

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where system, the teachings of the present invention may be utilized with any suitable file system, including a write in place file system.

Thus, a method and apparatus for auto-recovery have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
setting a recovery indicator for a storage space configured for a replication operation; wherein the recovery indicator is set as an attribute of a logical object representing the storage space, and the recovery indicator is used for selecting between a first clone type and a second clone type for a recovery operation performed for maintaining consistency between information stored at a read-only copy of the storage space and information stored at the storage space after the read-only copy is created;
replicating the storage space and the recovery indicator by generating a first read-only copy of the storage space and storing a metadata associated with the first read-only copy, where the metadata includes the recovery indicator; and
based on the recovery indicator and a selected clone type, using a clone of the logical object created after the first read-only copy is generated for the recovery operation.

2. The method of claim 1, further comprising:
generating a second read-only copy of the storage space for capturing information written to the clone of the logical object; and deleting the clone of the logical object, after the second read-only copy is generated.

3. The method of claim 2, wherein the logical object for representing the storage space is a logical unit number (LUN).

4. The method of claim 3, wherein prior to generating the first read-only copy, a processor executable module that manages the replication operation sets a LUN attribute as the recovery indicator indicating that recovery is needed for the LUN.

5. The method of claim 4, wherein the LUN attribute is stored with the first read-only copy.

6. The method of claim 4, wherein if the LUN attribute for recovery is set, then a LUN clone, as the first clone type, is used for recovery, the LUN clone being an image of the LUN that is replicated in the first read-only copy.

7. The method of claim 5, wherein the LUN clone is deleted after the second read-only copy is generated.

8. The method of claim 5, wherein for generating the second read-only copy, if the LUN attribute for recovery is set, then a LUN clone name is modified by using a same name as the LUN that is replicated in the first read-only copy and the LUN name is modified such that the modified LUN name is different from the modified LUN clone name.

9. The method of claim 8, wherein after the second read-only copy is generated, the modified LUN name and the modified LUN clone name are reversed to their original names.

10. The method of claim 1, wherein recovery is performed for a virtual environment comprising of a plurality of virtual machines having access to the storage space.

11. A machine implement method for replicating a storage space represented as a logical unit number (LUN), comprising:
generating a LUN attribute for enabling a recovery operation that is used for maintaining consistency between information stored at a read-only copy of the LUN and information stored at the LUN after the read-only copy is generated; wherein the LUN attribute is used for selecting between a first clone type and a second clone type for the recovery operation;
storing the LUN attribute with a first read-only copy of the LUN;
using a LUN clone, as the first clone type, for the recovery operation, where the LUN clone is a copy of the LUN that is created after the first read-only copy is generated and to which an application is allowed to write; and
generating a second read-only copy capturing information stored at the LUN clone including information added after the first read-only copy is generated.

12. The method of claim 11, further comprising:
deleting the LUN clone after generating the second read-only copy.

13. The method of claim 11, wherein the second read-only copy is generated after a LUN clone name is modified by using a same name for the LUN and the LUN name is modified such that the modified LUN name is different from the modified LUN clone name.

14. The method of claim 13, wherein the modified LUN name and the modified LUN clone name are reversed to their original names after the second read-only copy is generated.

15. The method of claim 11, wherein recovery is performed for a virtual environment with a plurality of virtual machines executed by a computing system, where the plurality of virtual machines have access to the storage space.

16. A machine implemented method for a storage space represented by a logical object, comprising:
storing a recovery indicator with a first replicated read-only copy of information stored at the storage space: where the recovery indicator is used for selecting between a first clone type and a second clone type for a recovery operation performed for maintaining consistency between information stored at the first replicated read-only copy and information stored at the storage space, after the first replicated read-only copy is created:
based on the recovery indicator, providing a clone of the storage space as a writable option to write data to the storage space, after the first replicated read-only copy is created;
after writing to the clone, using an original name of the logical object for renaming the clone of the storage space; and
generating a second replicated read-only copy for capturing changes to the clone of the storage space after the first replicated read-only copy is created.

17. The method of claim 16, wherein a storage system manages the storage space and presents the storage space as a logical unit number (LUN).

18. The method of claim 17, wherein a computing system executes a storage system interface for interfacing with the storage system and detecting when recovery for the LUN is needed, based on the recovery indicator.

19. The method of claim 18, wherein the clone is a LUN clone presented by the storage system interface as a writable option.

20. The method of claim 19, wherein the LUN clone is deleted after generating the second replicated read-only copy.

* * * * *